(12) United States Patent
Jagiella

(10) Patent No.: US 7,285,950 B2
(45) Date of Patent: Oct. 23, 2007

(54) POSITION MEASURING SYSTEM AND PNEUMATIC CYLINDER

(75) Inventor: Manfred Jagiella, Notzingen (DE)

(73) Assignee: BALLUFF GmbH, Neuhausen (DE)

( * ) Notice: Subject to any disclaimer, the term of this patent is extended or adjusted under 35 U.S.C. 154(b) by 167 days.

(21) Appl. No.: 10/913,980

(22) Filed: Aug. 6, 2004

(65) Prior Publication Data

US 2005/0040815 A1 Feb. 24, 2005

(30) Foreign Application Priority Data

Aug. 18, 2003 (DE) ................ 103 38 265
May 10, 2004 (EP) ................ 04011058

(51) Int. Cl.
*G01B 7/14* (2006.01)
*G01B 7/30* (2006.01)
*H01F 5/00* (2006.01)

(52) U.S. Cl. ................ 324/207.15; 324/207.24; 324/207.25

(58) Field of Classification Search ........... 324/207.11, 324/207.15, 207.16, 207.17, 207.18, 207.22, 324/207.24, 207.25, 202; 336/20, 118, 225, 336/232; 73/313, 314; 250/559.25, 559.32, 250/565; 356/614, 615, 622
See application file for complete search history.

(56) References Cited

U.S. PATENT DOCUMENTS

| | | | | |
|---|---|---|---|---|
| 6,373,239 | B1 | 4/2002 | Nekado | |
| 6,629,371 | B1 * | 10/2003 | Shirai et al. | 33/290 |
| 6,825,656 | B2 * | 11/2004 | Hanisch | 324/207.2 |
| 6,853,183 | B2 * | 2/2005 | Kindler | 324/207.17 |
| 2001/0052771 | A1 | 12/2001 | Jagiella | |
| 2002/0014128 | A1 | 2/2002 | Kroll et al. | |
| 2002/0163328 | A1 | 11/2002 | Jagiella et al. | |
| 2003/0151402 | A1 | 8/2003 | Kindler | |
| 2003/0169027 | A1 | 9/2003 | Kang et al. | |
| 2003/0169038 | A1 | 9/2003 | Kang et al. | |
| 2003/0169039 | A1 | 9/2003 | Kang et al. | |

FOREIGN PATENT DOCUMENTS

| | | |
|---|---|---|
| CH | 647 316 | 1/1985 |
| DE | 44 06 417 | 9/1995 |
| DE | 198 12 965 | 10/1999 |
| DE | 299 22 458 | 5/2000 |
| DE | 200 11 223 | 11/2000 |
| DE | 100 44 839 | 4/2001 |
| DE | 100 25 661 | 12/2001 |
| DE | 101 24 483 | 12/2001 |
| DE | 100 38 001 | 2/2002 |
| DE | 100 39 216 | 2/2002 |
| DE | 101 27 760 | 2/2003 |

(Continued)

*Primary Examiner*—Edward Lefkowitz
*Assistant Examiner*—Kenneth J Whittington
(74) *Attorney, Agent, or Firm*—Lipsitz & McAllister, LLC

(57) ABSTRACT

A position measuring system is proposed, comprising: a transmitter, a first displacement transducer, to which the transmitter is contactlessly coupled with a coupling strength which is dependent on the relative position between the first displacement transducer and the transmitter, a second displacement transducer, to which the transmitter is contactlessly coupled with location-dependent coupling strength, and a fixing device for fixing the first displacement transducer and the second displacement transducer in relation to each other, so that the measuring range of the position measuring system extends over the first displacement transducer and the second displacement transducer.

51 Claims, 10 Drawing Sheets

FOREIGN PATENT DOCUMENTS

| | | |
|---|---|---|
| DE | 101 37 560 | 2/2003 |
| DE | 202 16 024 | 2/2003 |
| DE | 102 20 981 | 10/2003 |
| DE | 102 20 982 | 10/2003 |
| DE | 102 20 983 | 10/2003 |
| DE | 102 27 425 | 1/2004 |
| EP | 1 139 069 | 10/2001 |
| GB | 2195447 * | 4/1988 |

* cited by examiner

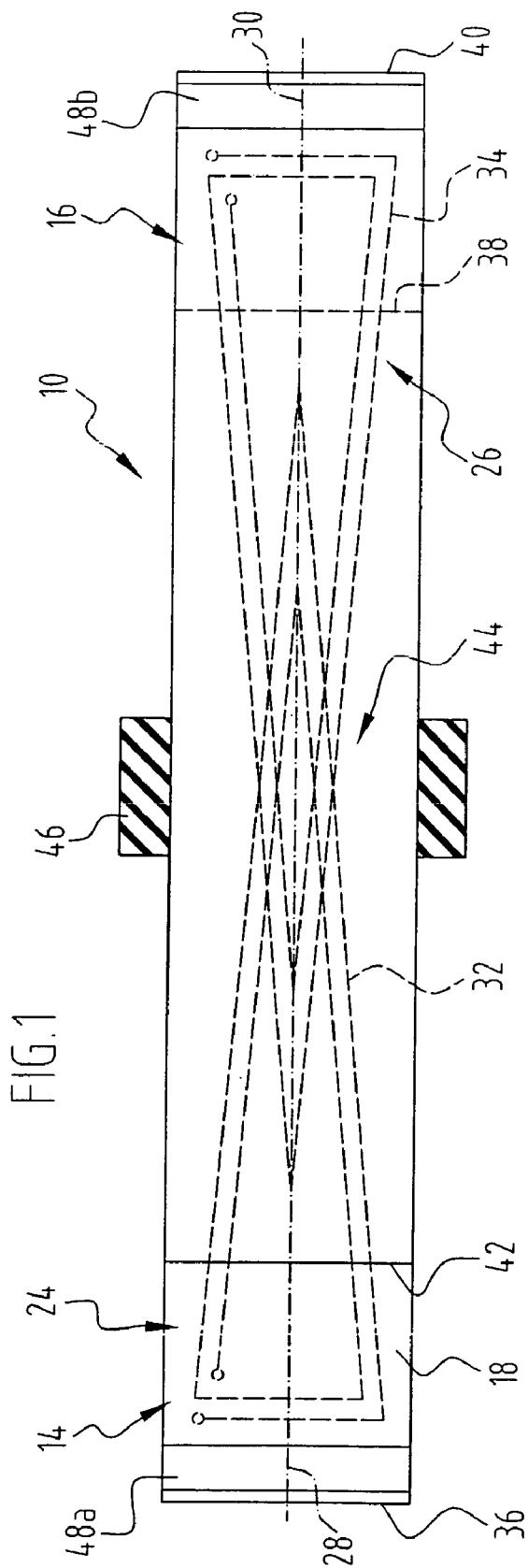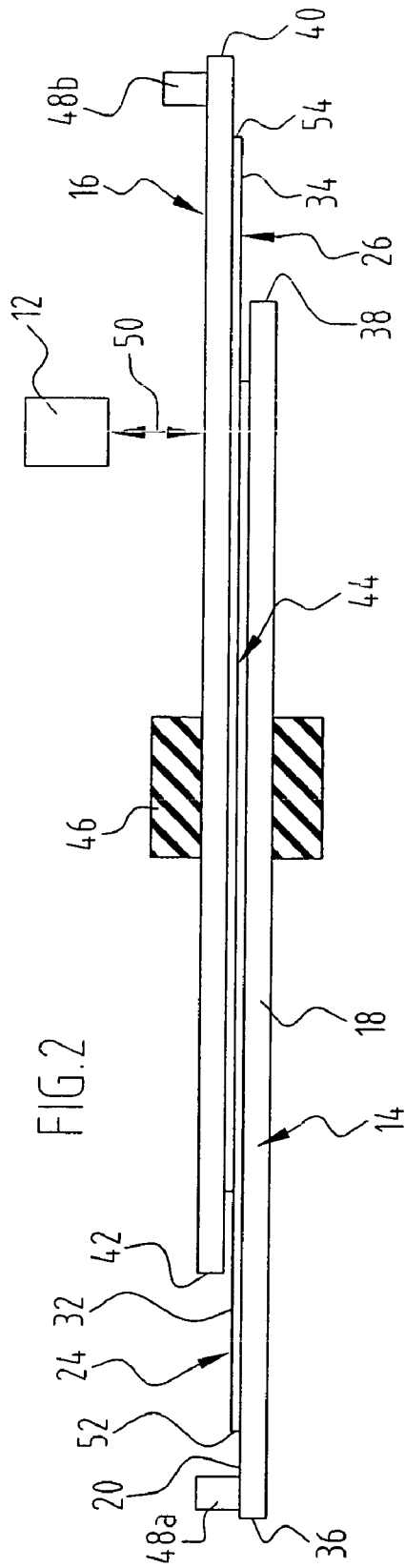

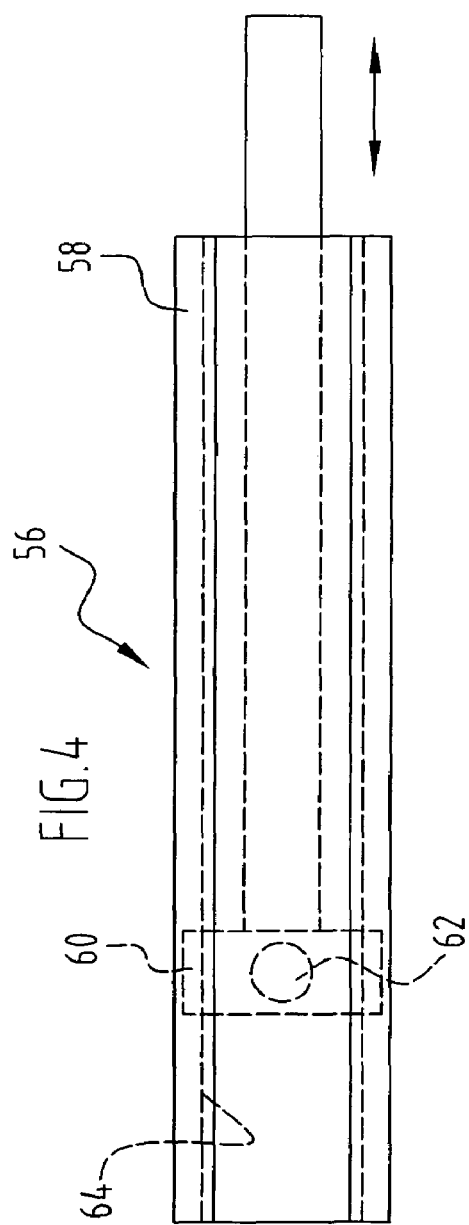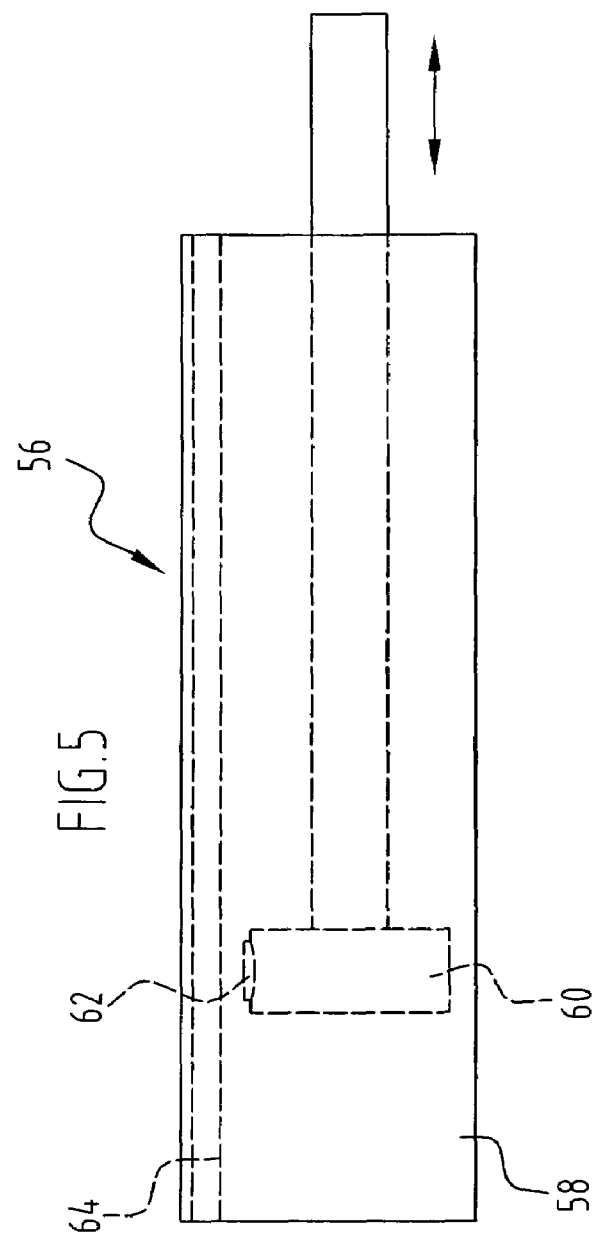

POSITION MEASURING SYSTEM AND PNEUMATIC CYLINDER

The present disclosure relates to the subject matter disclosed in German application No. 103 38 265.8 of Aug. 18, 2003 and in European application No. 04 011 058.7 of May 10, 2004, which are incorporated herein by reference in its entirety and for all purposes.

BACKGROUND OF THE INVENTION

The invention relates to a position measuring system.

The invention also relates to a pneumatic cylinder.

DE 100 25 661 A1 or US 2001 0052771 A1 and DE 101 24 483 A1 or US 2002 0163328 A1 disclose displacement measuring systems (position measuring systems) with a transmitter and a sensor, the transmitter being electromagnetically coupled to the sensor. The sensor comprises an inductive element, which in turn is coupled to an oscillator and, by its quality and/or effective inductance, influences this oscillator. The quality and/or effective inductance of the inductive element is in this case determined by the size of an effective sensor region to which the transmitter is coupled. The sensor is formed in such a way that the size of the effective sensor region to which the transmitter is coupled is dependent on the relative position between the transmitter and the sensor transversely to a direction of separation therebetween.

SUMMARY OF THE INVENTION

In accordance with the invention, a position measuring system is provided which can be variably used.

In accordance with the invention, a transmitter is provided, a first displacement transducer is provided, to which the transmitter is contactlessly coupled with a coupling strength or intensity which is dependent on the relative position between the first displacement transducer and the transmitter, a second displacement transducer is provided, to which the transmitter is contactlessly coupled with location-dependent coupling strength, and a fixing device is provided for fixing the first displacement transducer and the second displacement transducer in relation to each other, so that the measuring range of the position measuring system extends over the first displacement transducer and the second displacement transducer.

The solution according to the invention allows the measuring length to be set in a simple way and consequently allows a system which can be adjusted in length to be provided in a simple way. The length can in this case be adjusted quickly and in particular on an application or an element for which it is being used. This produces a system of great variability which operates reliably. A telescopic relative displacement between the first displacement transducer and the second displacement transducer allows measuring lengths to be set in a wide range. The measuring range is in this case greater than the respective measuring length of the individual displacement transducers.

It has been found for example that, with two displacement transducers, which comprise coils with a length of 18 cm as sensitive elements, the measuring length can be increased to twice this length, the monotonicity of the characteristic being obtained in the entire range of lengths.

It may in principle be provided that the relative fixing of the two displacement transducers in relation to each other is achieved by separate fixing on a further component. The two displacement transducers may in this case be spaced apart or preferably overlap.

It is particularly advantageous if the first displacement transducer and the second displacement transducer can be fixed with respect to each other by the fixing device. This allows in particular a closed uninterrupted measuring distance to be produced.

In particular, it is advantageous if the first displacement transducer and the second displacement transducer can be fixed with respect to each other in such a way that the measuring range of the position measuring system can be adjusted. The measuring range is determined by the relative position of the two displacement transducers in relation to each other, which once again can be adjusted.

In particular, the first displacement transducer and the second displacement transducer are fixably displaceable with respect to each other, in order on the one hand, with set fixing, to permit reliable and accurate measurement and on the other hand, to be able to adjust the measuring range by means of the displacement (before the measurement).

The position measuring system according to the invention has an adjustability in length, which can be carried out by the user and is determined by the ability to set the relative position and in particular the fixing between the first displacement transducer and the second displacement transducer.

In particular, the first displacement transducer and the second displacement transducer have an overlapping region in the position measuring system. The overlapping region is defined by both the first displacement transducer and the second displacement transducer lying there in the coupling region and in particular the field exposure region of the sensor. This overlapping region also allows for example simple fixing of the two displacement transducers with respect to each other to be achieved.

It is also advantageous if the size of the overlapping region can be adjusted, in order once again to be able to set the measuring length.

It is possible in principle for the fixing device to fix the two displacement transducers in relation to each other with positive engagement. Fixing can be achieved in a simple way if the fixing device fixes the first displacement transducer and the second displacement transducer with respect to each other with nonpositive engagement. By discontinuing or reducing the force which brings about the fixing with positive or nonpositive engagement, a user can displace the two displacement transducers in relation to each other in order in this way to set the measuring length. In the case of fixing with nonpositive engagement, no screws or the like have to be loosened for this purpose.

It is advantageous if the fixing device engages around the first displacement transducer and the second transducer. This allows fixing between these two displacement transducers to be achieved in a simple way.

Fixing can be achieved in a particularly simple way if the fixing device comprises an elastic element, such as a rubber band or a shrink tube, by means of which the first displacement transducer and the second displacement transducer can be clamped with respect to each other. This allows fixing to be achieved with minimal effort. In particular, carrier boards do not have to be modified. The position measuring system according to the invention can then also be produced at low cost.

In particular, the fixing device is produced from an electrically insulating material, in order that it has no electrical influence if it acts on a carrier board.

It may also be provided that the fixing device is formed in such a way that it holds the first displacement transducer and/or holds the second displacement transducer. The fixing device may then for example hold the two displacement transducers separately and in this way ensure relative positioning of the two displacement transducers in relation to each other. It may also hold only one displacement transducer, the second displacement transducer then being held by a fixing device which fixes the first displacement transducer with respect to the second displacement transducer.

The fixing device comprises for example a housing which may the adjustable in length, in which the first displacement transducer and/or the second displacement transducer is held. In particular, at least one displacement transducer is then displaceable in the housing. The housing ensures the relative positioning of the two displacement transducers. A fixing device such as the rubber band mentioned above may be additionally provided, in order to fix the two displacement transducers directly with respect to each other.

It is also possible for the fixing device to comprise at least one recess in the housing for holding a displacement transducer. For example, the recess is formed in the shape of a groove or the shape of a channel. A displacement transducer can then be positioned in such a recess and also be fixed there in the recess, for example by clamping. If the recess and the displacement transducer are formed in an appropriately adapted way, it can be achieved for example that the displacement transducer does not protrude beyond the surface of the housing. Such a displacement transducer can then be disposed flush with the surface of the housing or disposed set back from it.

In the case of one embodiment, the fixing device comprises a first recess on a housing for holding the first displacement transducer and a second recess on the housing for holding the second displacement transducer. Given appropriate positioning of the two displacement transducers in relation to each other, it is possible to set an overlapping region in which the two displacement transducers can for example be exposed together to the magnetic field of a transmitter.

In particular, the first recess and the second recess are disposed to be parallel, so that the measurable displacement range can be set in a simple way.

It is advantageous if the at least one recess is formed as a groove in which the associated displacement transducer can be fixed. This allows the position measuring system according to the invention to be integrated in a housing in a simple way.

In particular, the at least one recess and the associated displacement transducer are formed in a way adapted to each other such that the displacement transducer is longitudinally displaceable in the recess before the fixing. This allows an overlapping region to be set in a simple way. It is then also possible in a simple way (given appropriate configuration of a housing of the displacement transducer and of the recess) to achieve the effect that the displacement transducer is displaceable only in the longitudinal direction, i.e. cannot be taken out of the recess from above. As a result, fixing can be achieved in a simple way, since only the longitudinal displaceability has to be blocked.

The second displacement transducer is positioned for example on the first displacement transducer. This allows fixing to be achieved in a simple way.

An ability to set the measuring length can be achieved in a simple way if a longitudinal axis of the first displacement transducer and a longitudinal axis of the second displacement transducer are parallel. This allows the measuring length to be increased or reduced, without the characteristic being influenced with respect to its monotonicity. The longitudinal axis of the displacement transducers in this case preferably coincides substantially with the direction of movement of the transmitter.

It is most particularly advantageous if the first displacement transducer and the second displacement transducer respectively comprise one or more sensitive elements which are formed such that they vary locationally. The locational information for determining the position of the transmitter is then correspondingly coded in the sensitive element, for example in the geometrical configuration of the sensitive element. A corresponding displacement measuring system is described in DE 100 25 661 A1 or US 2001 0052771 A1, to which reference is expressly made.

It is advantageous if the first displacement transducer and the second displacement transducer respectively have an effective sensor region which varies transversely to a direction of separation between the transmitter and the respective displacement transducer. A corresponding displacement transducer can be configured in a simple way, for example by a flat coil of a corresponding geometrical shape being disposed on a printed circuit board. For example, the coil has a triangular shape, so that its width varies transversely to a longitudinal direction from a large value at one end of the coil to a small value at a vertex of the triangle. The change is monotonic, whereby a substantially linear characteristic for the locational dependence can be achieved at least for an individual displacement transducer.

The effective sensor region in this case varies in particular transversely to a longitudinal direction of the respective displacement transducer, so that with different positions of the transmitter along the longitudinal direction different effective sensor regions are obtained, whereby in turn different sensor signals are obtained and, as a result, the position of the transmitter along this longitudinal direction can be determined.

In the case of a preferred example, the first displacement transducer and the second displacement transducer respectively comprise at least one inductive element as the sensitive element. The inductive element is in this case preferably coupled to an oscillator and the inductive element influences the oscillator by means of the quality and/or effective inductance. The operating principle of such inductive elements is described in DE 100 25 661 A1 and US 2001 0052771 A1, to which reference is expressly made.

It is particularly advantageous if the at least one inductive element is disposed as a flat coil on a carrier. This allows the vertical dimensions of the sensitive element to be kept small. This in turn achieves the effect that the vertical distance of the transmitter from the sensitive element of the first displacement transducer and from the sensitive element of the second displacement transducer deviates only by a small distance that is insignificant for the measurement.

It is advantageous if the carrier comprises a printed circuit board, which is formed in particular as a platelet. It is then possible to fix and displace the two displacement transducers with respect to each other in a simple way. The carrier may in this case be formed such that it is completely flexible or at least partly flexible. In particular, the carrier may comprise a rigid carrier part and one or more flexible carrier parts which are disposed on the rigid carrier part. Such a position measuring system is described in DE 101 24 483 A1 or US 2002 0163328 A1, to which reference is expressly made.

In the case of flexible carriers, the carrier is for example folded, bent or rolled. In this way, a carrier with small transverse dimensions can be formed, to allow in turn a displacement transducer with small transverse dimensions to be provided. Such a displacement transducer can be positioned for example in a groove.

It may be provided that the at least one inductive element is formed as a triangle. This allows a locational dependence of the effective sensor region to be set in a simple way, and in particular a monotonic locational dependence.

It is advantageous in particular if the first displacement transducer and the second displacement transducer overlap in the region of vertices of a triangle of their respective inductive elements.

The first displacement transducer and the second displacement transducer are preferably fixed in relation to each other in such a way that their respective inductive elements are facing each other. Consequently, the vertical distance between the inductive elements is minimized, so that the difference in the vertical distance from a transmitter is also minimized.

At least one electrical insulating layer is advantageously disposed between the inductive elements of different displacement transducers, in order to prevent electrical contact of the inductive elements.

In the case of a further embodiment of the position measuring system according to the invention, a soft-magnetic core is provided, around which at least one measuring coil is wound. In particular, a reference coil is coupled in series, the (at least one) measuring coil which is wound around the soft-magnetic core being integrated in a resonant circuit. It may also be provided that the at least one measuring coil is disposed in a bridge circuit, which is subjected to external excitation.

The soft-magnetic core has a defined magnetization. If a magnet which is magnetized axially with respect to the measuring coil is used as the transmitter, this magnet influences the magnetization and this influence in turn influences the resonant circuit or the bridge circuit in attenuation, phase and frequency. If the soft-magnetic core is elongate, this influencing is dependent on the position of the transmitter in relation to the soft-magnetic core, so that the positional information with respect to the transmitter can be obtained by means of the influencing.

In particular, the soft-magnetic core is of a multipart form, with at least a first core element as a first displacement transducer and a second core element as a second displacement transducer, the core elements being positionable in relation to each other. The core elements act at least in combination with the measuring coil as displacement transducers. The adjustability of the length of the soft-magnetic core, in particular the relative positioning of the two core parts in relation to each other, allows the measuring range to be set. The measuring coil is then chosen such that it surrounds the entire core (which is made up of the core parts).

Evaluation electronics may be disposed at least partly on a carrier for a sensitive element or be disposed outside such a carrier.

In particular if the transmitter is a magnet, it is advantageous if at least one displacement transducer is provided with material which can be magnetically saturated and is provided for example with a layer which can be magnetically saturated, such as a layer of Mu metal.

If the layer which can be magnetically saturated is produced from an electrically conducting material, such as for example Mu metal, a good shielding effect with respect to electromagnetic interference is also obtained.

The layer which can be magnetically saturated may be formed by means of a film and in particular by means of a self-adhesive film. This allows the application of the magnetic layer to the carrier to be simplified. The magnetic layer may in this case be disposed on one side or two sides.

The layer which can be magnetically saturated may be disposed on a side facing the other displacement transducer and/or a side facing away from it.

It is also possible for a carrier to be provided with a metal layer on the side facing away from the other displacement transducer and, in particular, to be copper-clad. This produces a good shielding effect while allowing production which is simple and inexpensive.

It may also be provided that the at least one inductive element is produced from a magnetically conducting or electrically conducting material. A magnetic saturation can then be achieved directly at the sensitive element, the location-dependent information being obtained of course on the basis of the local saturation.

It may also be provide that, in addition to the first displacement transducer and the second displacement transducer, at least one further displacement transducer is fixed with respect to an adjacent displacement transducer. This produces a further possibility for setting the length measuring range.

It is advantageous if a holder is provided for fixing the position measuring system on an application for which it is being used, such as for example a pneumatic cylinder.

The holder is formed for example for the purpose of holding sensors on a functional unit. Such a holder, which can be used universally, is described in DE 100 38 001 A1 or US 2002 0014128 A1, to which reference is expressly made.

In particular, an adapter is then provided for the position measuring system, by means of which the said system can be fixed on the holder. This allows the position measuring system to be fixed in a simple way on a large number of functional units.

The position measuring system may in this case be fixable on the holder by means of the fixing device, it then being possible for the fixing device to be fixed for example on the adapter. It is also possible for the position measuring system to be fixable on the holder by means of a displacement transducer, the displacement transducer then being fixed directly on the adapter.

The position measuring system according to the invention can be used in an advantageous way in the position measurement for a pneumatic cylinder.

The invention also relates to a pneumatic cylinder, the said cylinder being provided with the position measuring system according to the invention.

In the case of pneumatic cylinders, it is often necessary for the reaching of specific switching positions of a piston or the piston movement to be detected. Many different designs of pneumatic cylinders exist, with in particular different lengths of housing. The position measuring system according to the invention, with a measuring range which can be set, allows pneumatic cylinders to be equipped with a position measuring system in a simple way.

For example, the position measuring system is disposed on a housing of the pneumatic cylinder and is in this case disposed in particular in a groove in a housing wall. A user can program switching points in a simple way, since the position measuring system according to the invention can carry out an absolute position measurement and can define switching points on the basis of the absolute position measurement.

It is also possible to locate the position measuring system according to the invention inside a housing of the pneumatic cylinder.

The following description of preferred embodiments serves together with the drawing for a more detailed explanation of the invention.

BRIEF DESCRIPTION OF THE DRAWINGS

FIG. 1 shows a sectional view of an exemplary embodiment of a position measuring system according to the invention;

FIG. 2 shows a lateral sectional view of the position measuring system according to FIG. 1;

FIG. 4 schematically shows a pneumatic cylinder which is provided with a position measuring system according to the invention;

FIG. 5 shows a side view of the pneumatic cylinder according to FIG. 4;

DETAILED DESCRIPTION OF THE INVENTION

Figure 3:
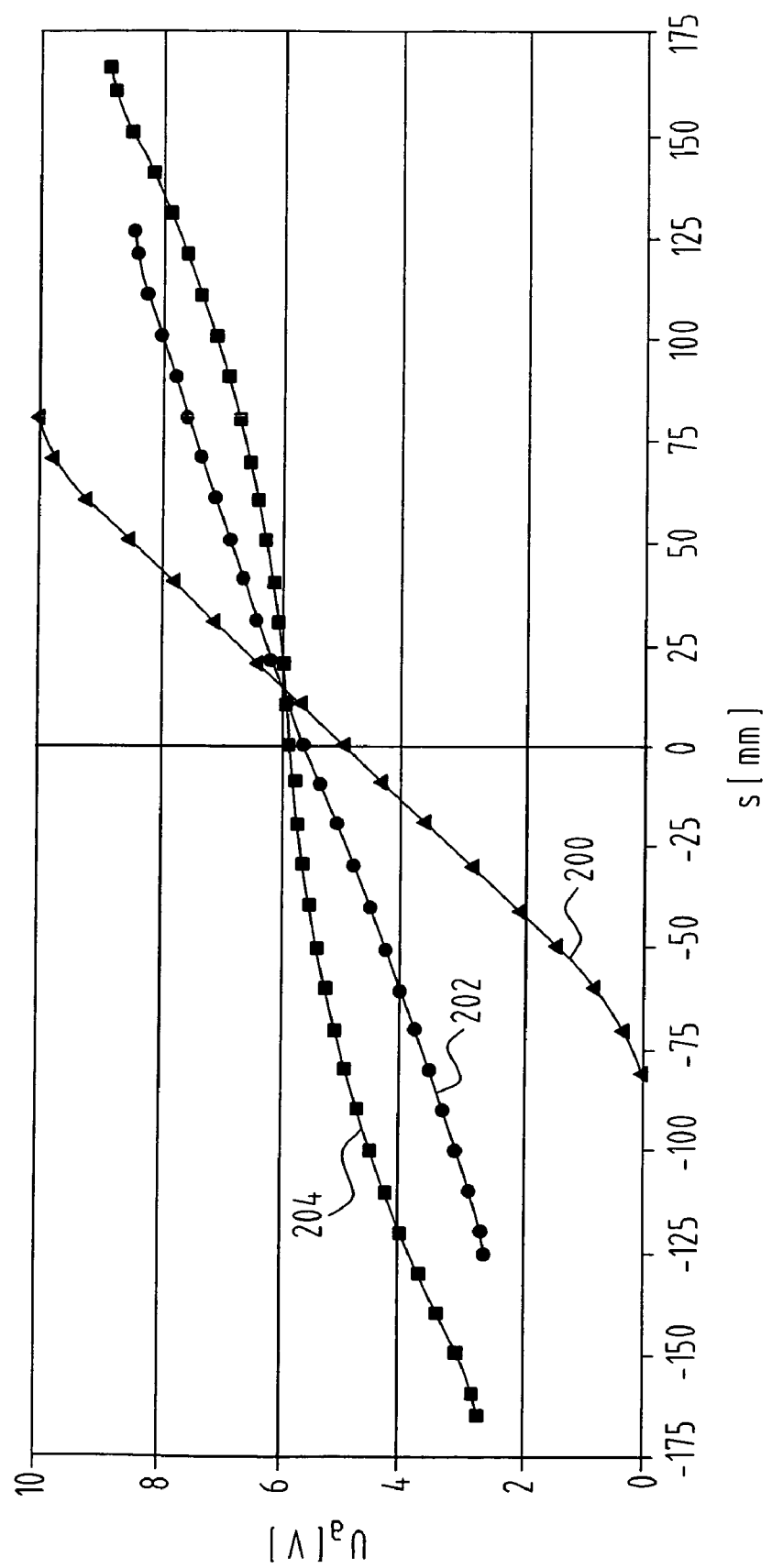
FIG. 3 shows measuring diagrams for the output voltage in volts over the displacement path of a transmitter for the position measuring system according to FIGS. 1 and 2, with different overlaps.

A first exemplary embodiment of a position measuring system according to the invention, which is shown in FIGS. 1 and 2 and is designated there as a whole by 10, comprises a transmitter 12 (FIG. 2), which is in particular a magnet, such as for example a permanent magnet or an electromagnet.

The transmitter 12 may also be a metal body which is inductively coupled to a sensor.

The transmitter 12 is coupled to a movable object, the position of which is to be established. For example, the transmitter is coupled to a piston of a pneumatic cylinder.

The position measuring system 10 comprises a first displacement transducer (pickup) 14 and a second displacement transducer (pickup) 16. The two displacement transducers 14 and 16 have a similar construction and may even be identically constructed.

The two displacement transducers 14 and 16 are formed in particular in such a way that they are each in themselves fully functional, i.e. can be used to determine positional data of a transmitter 12 which is positioned at a distance above the respective displacement transducer 14 or 16.

The displacement transducers 14, 16 respectively comprise a printed circuit board 18 as a carrier. This printed circuit board 18 is preferably formed as a platelet, with an upper side 20 and an underside 22, which are substantially parallel to each other.

Sensors are respectively disposed on the printed circuit board 18 for the two displacement transducers 14, 16, namely a sensor 24 for the first displacement transducer and a sensor 26 for the second displacement transducer. The sensors 24, 26 are formed in a spatially varying manner, in such a way that the relative position of the transmitter 12 in a longitudinal direction 28 of the first displacement transducer 14 or a longitudinal direction 30 of the second displacement transducer 16 is determined by a spatially varying sensor region, which causes a spatially varying coupling strength along the longitudinal directions 28 and 30, respectively, and does so even when the distance of the transmitter 12 above the displacement transducers 14, 16 remains the same.

The sensors 24, 26 respectively comprise for example, as sensitive elements, coils 32, 34, which have been applied to the associated printed circuit board 18. In the case of the exemplary embodiment shown in FIG. 1, the coils 32, 34 are configured in a triangular form as conductive elements and in particular are disposed as printed coils on the respective printed circuit board 18.

The coil 32 has in its longitudinal direction 28 a varying shape in its transverse dimension, so that the effective sensor region decreases from a first end 36 to a second end 38 of the printed circuit board 18, and in particular decreases monotonically. In the same way, the effective sensor region for the coil 34 of the second displacement transducer 16 decreases from a first end 40 to an opposite second end 42, and in particular decreases monotonically.

The two displacement transducers 14 and 16 are positioned overlapping each other in such a way that the end 36 of the first displacement transducer 14 and the end 40 of the second displacement transducer 16 are facing away from each other. The coil 34, as the sensitive element of the second displacement transducer 16, faces toward the coil 32 of the first displacement transducer 14. In an overlapping region 44, the two displacement transducers 14, 16 overlap with their coils 32, 34. In this region, the second displacement transducer 16 lies on the first displacement transducer 14.

A fixing device 46, which fixes the two displacement transducers 14 and 16 with respect to each other, is provided. This fixing device 46 is in this case formed in such a way that it engages around the two displacement transducers 14, 16 and holds them against each other in a clamping manner. The fixing device 46 in this case allows a displacement of the two displacement transducers 14, 16 in relation to each other (when the clamping action is discontinued), in order to set the size of the overlapping region 44 and thereby in turn the distance between the ends 36 and 40. In this way, the measuring length of the position measuring system 10 is once again set. A specific relative position between the two displacement transducers 14 and 16 is fixed by the fixing device 46.

In the case of an exemplary embodiment, the fixing device 46 is formed by an elastic band such as a shrink band, which braces the two displacement transducers 14 and 16 with respect to each other in the overlapping region 44 and in this way fixes them on each other. By corresponding (elastic) extension of the fixing device 44, the relative position between the first displacement transducer 14 and the second displacement transducer 16 can be changed in a simple way.

For the evaluation of determined positional data, evaluation electronics 48a, 48b, may be disposed on the printed circuit boards 18 of the respective displacement transducers 14, 16.

It is also possible for the evaluation electronics to be disposed outside these printed circuit boards.

The coils 32, 34 are formed as flat coils. They are in particular coupled as an inductive element to an oscillator, the coupling attachment of the transmitter 12 then influencing the quality and/or effective inductance of the oscillator, the quality and/or effective inductance of the coils 32, 34 in turn being influenced by the position of the transmitter 12 in the longitudinal direction 28, 30. The longitudinal directions 28, 30 are transverse and in particular perpendicular to a direction of separation 50 between the transmitter 12 and the displacement transducers 14, 16.

The oscillator may be self-excited or separately excited, in that it is for example excited by way of externally generated pulses. The coils may also be disposed in a bridge circuit, which is subjected to external excitation.

The locational information with respect to the relative positioning between the sensor 24 or 26 and the transmitter 12 lies in the geometrical structure of the coil 32 or 34, respectively, and in the relative positioning between the coil 32 or 34 and the transmitter 12. An effective sensor region, to which the transmitter 12 is coupled, varies along the measuring direction which substantially corresponds to the longitudinal direction 28 or 30. A displacement measuring system of this type is described in DE 100 25 661 A1 or US 2001 0052771 A1, to which reference is expressly made.

The locational information is extracted directly on the basis of the effective inductance of the coil 32 or 34 and/or the change in quality. The change in quality can be determined in a simple way for example on the basis of the amplitude or the frequency of an oscillator to which the coils 32, 34 are coupled.

The length of the measuring range, the measuring accuracy and the measuring resolution can be influenced by an appropriate structuring of the coil 32 or 34 with respect to its length, its number of turns per unit length and its shaping.

According to the invention, the first displacement transducer 14 and the second displacement transducer 16 are fixed with respect to each other with an overlapping region 44 by means of the fixing device 46, with an overlapping region 44. This produces a measuring length which extends over the first displacement transducer 14 and the second displacement transducer 16 and is determined in particular by the distance between remote ends 52 and 54 of the coils 32, 34. This measuring length can be set in a simple way, that is by the overlapping region 44 being increased or reduced. The setting of the measuring length can be achieved in a simple way by means of the fixing device 46.

Measuring diagrams for the position measuring system 10 with overlapping regions 44 of different sizes are shown in FIG. 3. In these, the output voltage Ua is plotted against the position s of the transmitter. The position s=0 corresponds to the center of the position measuring system 10 with respect to the longitudinal directions 28, 30. The measuring points were recorded for a position measuring system in which the coils 32, 34 have a length of 18 cm in the longitudinal direction 28. The measuring curve 200 was obtained when there is full overlapping. The measuring range has an extent of about 16 cm, which corresponds substantially to the length of the coils 32, 34 apart from an edge region. It may be provided in this case that the printed circuit boards 18 comprise as carriers a rigid carrier part and one or more flexible carrier parts, which are disposed on the rigid carrier part. The edge region of the coils 32, 34 then lies in the flexible carrier part and this can be bent away, so that the end edge regions of the coils 32, 32 lie outside the measuring zone. A position measuring system of this type is described in DE 101 24 483 A1 or US 2002 0163328 A1, to which reference is expressly made.

It can be seen from the measuring curve 200 that the output signal in the measuring range is substantially linear.

The measuring curve 202 was recorded for the position measuring system according to FIGS. 1 and 2, with an overlap of 13.2 cm, that is to say the overlapping region 44 has an extent of 13.2 cm in the longitudinal direction 28. This produces an increased measuring range (in comparison with the measuring curve 200) of 25 cm. Here, too, an approximately linear response can be seen.

The measuring curve 204 was obtained for the same system, now with an overlap of 5 cm. The measuring range is now 34 cm. The measuring curve 204 has a monotonic progression.

It can be seen from the measuring curves 200, 202 and 204 that the measuring range can be set by setting the overlapping region 44. The measuring curves 200, 202, 204 have a monotonic progression, so that a position of the transmitter 12 can be unequivocally associated with a voltage output signal.

It is possible to use the position measuring system according to the invention to determine the location of the transmitter 12 in a measuring range that can be adjusted. It is also possible to program switching points, since the measuring curves for every measuring range that can be set have a monotonic progression. This makes it possible to establish whether, and if so when, a transmitter 12 reaches or has reached a specific position. If, for example, the location with s=−10 cm is to be set for the measuring range set of 34 cm (measuring curve 204 in FIG. 3), then it must be monitored whether the output voltage reaches a value of 4.4 volts. If this value of the output voltage is obtained, this indicates that the switching point has been reached by the transmitter 12.

It is possible in principle to influence the form of the measuring signal by shaping the coils 32, 34.

According to the invention, a simple position measuring system which can be adjusted in length is provided, by means of which a measuring length range can be set within wide limits in a simple way.

To avoid an electrical short-circuit when the coils 32, 34 lie one over the other, an insulating layer is provided. In this case, an insulating layer may be disposed either on the coil 32 or on the coil 34 or there may be such an insulating layer respectively on both coils.

If the transmitter 12 is a magnet, it is then advantageous if at least one of the displacement transducers 14, 16 is provided with a layer with a material which can be magnetically saturated and for example is provided with a film of such a material. If an electrically conductive material is used (on which a corresponding insulating layer is then disposed), a good shielding effect with respect to electromagnetic interference is then also obtained. For example, a self-adhesive Mu metal film or Vitrovac film is used.

It is possible in this case for the layer of material which can be magnetically saturated to be disposed either on the first displacement transducer 14 or on the second displacement transducer 16 and then preferably on that side of the displacement transducer which is facing the other displacement transducer.

It is also possible for each displacement transducer 14, 16 to be provided for example on its underside 22 with such a layer of a material which can be magnetically saturated.

It is also possible in principle for both displacement transducers 14, 16 to be provided on their underside 22 with such a layer, and then a further layer to be provided on the upper side 20, it then being possible for both displacement transducers 14, 16 or only one of the two displacement transducers to be provided with such a further layer.

In the case where no layer of a material which can be magnetically saturated is provided on the underside 22, a layer of a metallic material, and in particular a copper cladding, may be provided here, in order to increase the shielding effect.

It is also possible for the coils 32, 34 to be produced from a magnetically conductive and electrically conductive material; for example, the coils are produced from Mu metal.

The position measuring system according to the invention can be advantageously used in the case of a pneumatic cylinder, a pneumatic cylinder being schematically shown in FIGS. 4 and 5 and designated as a whole by 56. Such a pneumatic cylinder comprises a housing 58, in which a piston 60 is linearly displaceable. The piston 60 is provided with a magnet 62 as a transmitter.

The housing 58 has on its outer side a groove 64, into which the position measuring system 10 according to the invention or a holder for the latter can be inserted. This allows the measuring length to be set, so that it is possible with one type of position measuring system 10 to provide pneumatic cylinders 56 of different housing lengths with the position measuring system.

It is also possible in principle for the position measuring system 10 according to the invention to be located inside the housing 58.

Figure 6:
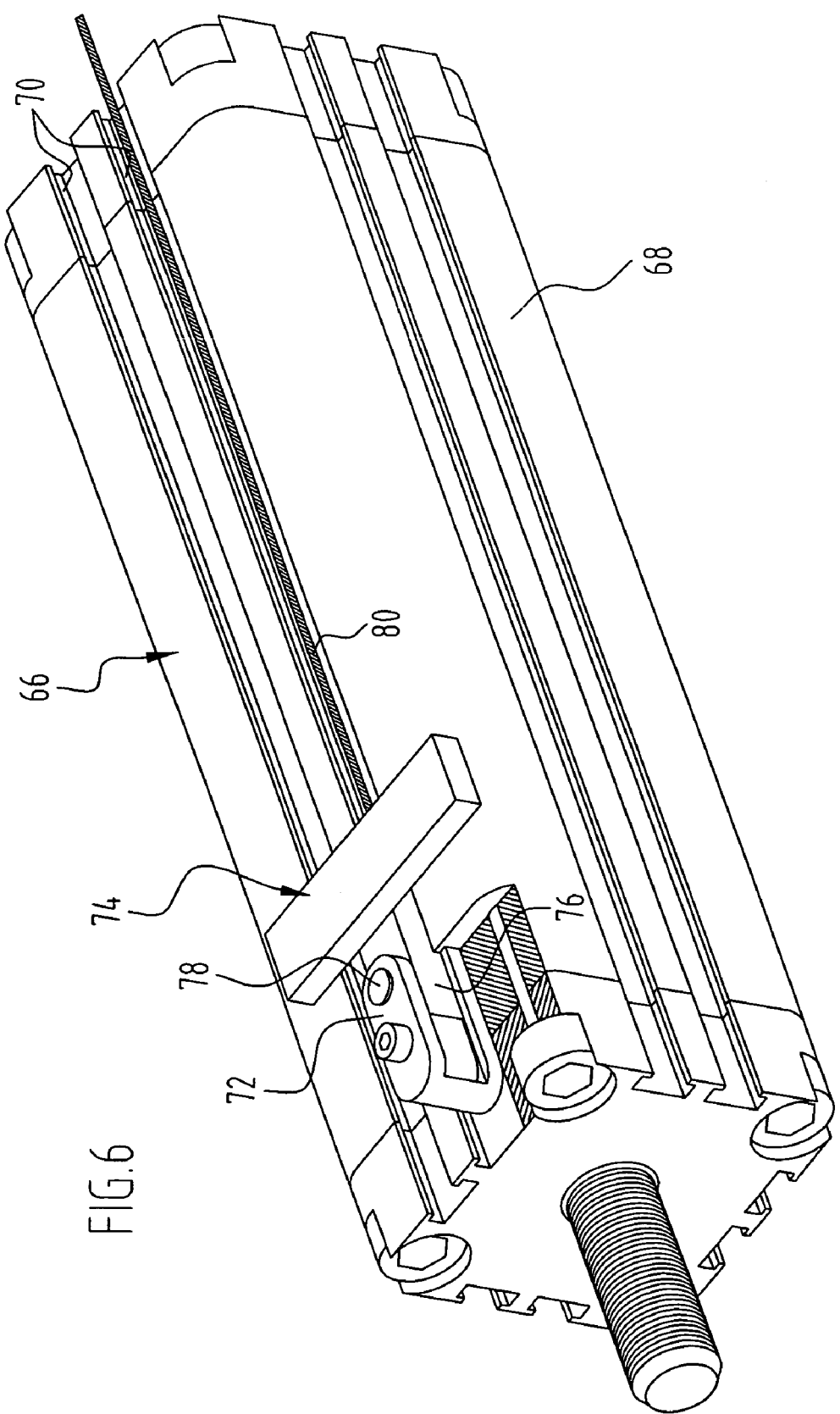
FIG. 6 shows a pneumatic cylinder in a perspective representation, in which a position measuring system according to the invention is fixable by means of a holder.

In the case of an exemplary embodiment shown in FIG. 6, a pneumatic cylinder 66 comprises a housing 68 with at least one groove 70. A holder 72 can be fixed in the groove. The holder 72 holds a position measuring system 74 according to the invention. The said system is fixed on the holder 72 by means of an adapter 76. The adapter 76 may in turn be fixed on the fixing device 46 or a displacement transducer 14 or 16.

It is preferably provided that the holder can be brought into a position following the adapter 76 in the longitudinal direction and in this position can be releasably connected by means of one or more positively engaging elements 78. The position measuring system 74 can then be fixed on the pneumatic cylinder 66 as a functional unit by means of the holder 72. Such a sensor arrangement with a holder is described in DE 100 38 001 A1, to which reference is expressly made.

A cable 80, which is coupled to the adapter 76, is led in the groove 70. By means of this cable 80, the position measuring system 74 can be supplied with electrical energy and measuring signals can be coupled out. The adapter 76 is preferably formed in such a way that it is coupled not only mechanically but also electrically to the position measuring system 74, in order to provide a line connection.

Figure 7:
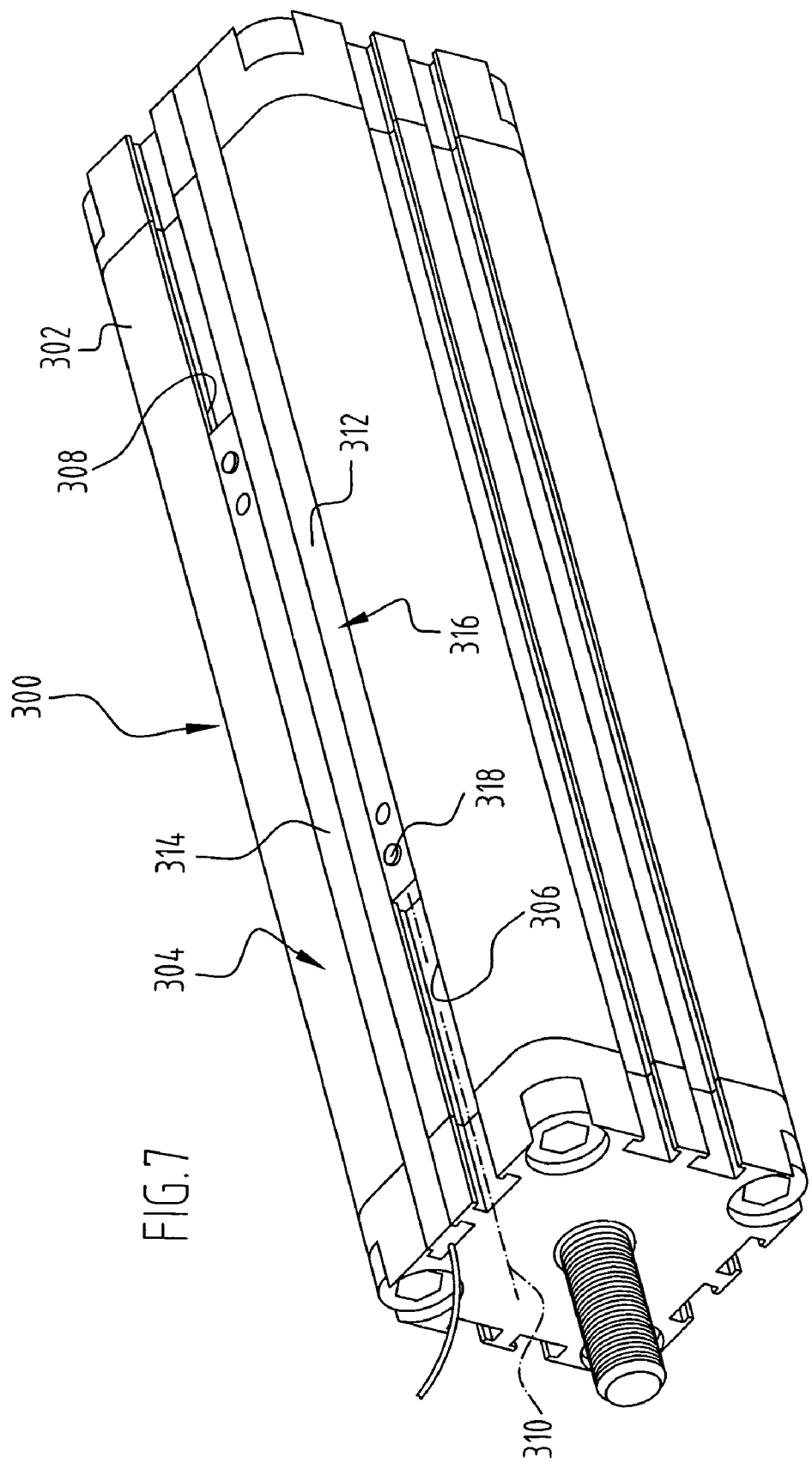
FIG. 7 shows a further example of a pneumatic cylinder with a fixing device.

In the case of a variant of this exemplary embodiment which is shown in FIG. 7, a fixing device 300 is formed by means of a housing 302 for example of a pneumatic cylinder. In the housing 302, a first recess 306 and a second recess 308, spaced apart therefrom, are formed on one side 304. The two recesses are formed in the shape of a groove or channel and respectively extend in a longitudinal direction 310.

The two recesses 306, 308 are disposed spaced apart from and parallel to each other.

In the two recesses 306 and 308, an associated first displacement transducer 312 and second displacement transducer 314 can be respectively held. In particular, the two displacement transducers 312 and 314 can be pushed into their respective recesses 306, 308.

Before the fixing, they are displaceable in the longitudinal direction 310 in the respective recesses 306, 308, so that they can be positioned in relation to each other. The two displacement transducers 312 and 314 can then be positioned in relation to each other in particular in such a way that an overlapping region 316 is formed. In the overlapping region 316, the two displacement transducers 312 and 314 are exposed together to the field when the magnetic transmitter of the pneumatic cylinder is located in the associated overlapping space (when the transmitter is located in the overlapping space at the overlapping region 316, the overlapping region is exposed to the field).

In the recesses 306 and 308, the corresponding displacement transducers 312 can be fixed for example by means of clamping, in order in particular to block the longitudinal displaceability in the respective recesses 306, 308. For this purpose, respective clamping elements 318 are provided for example.

In the case of the exemplary embodiment shown in FIG. 7, the recesses 306 and 308 are adapted to the displacement transducers 312 and 314 in such a way that the displacement transducers 312, 314 can only be pushed into the recesses 306, 308 in the longitudinal direction.

It is in particular also provided that an upper side of displacement transducers 312, 314 positioned in the recesses 306, 308 do not protrude beyond the corresponding side 304 of the housing 302, i.e. that the displacement transducers 312, 314 are positioned flush or set back.

The fixing device 300 is formed in interaction of the recesses 306, 308 with a housing configuration of the displacement transducers 312, 314 and the clamping elements 318.

Figure 11:
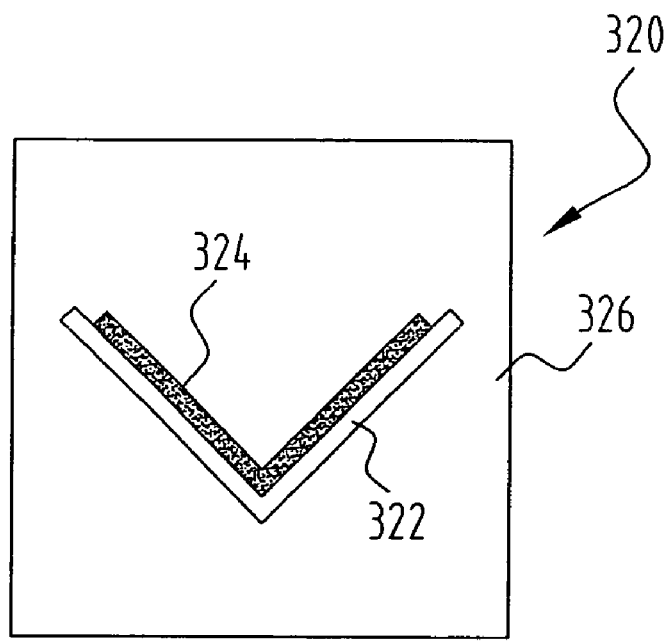
FIG. 11 shows a schematic sectional view of a displacement transducer with a folded flexible carrier.
Figure 12:
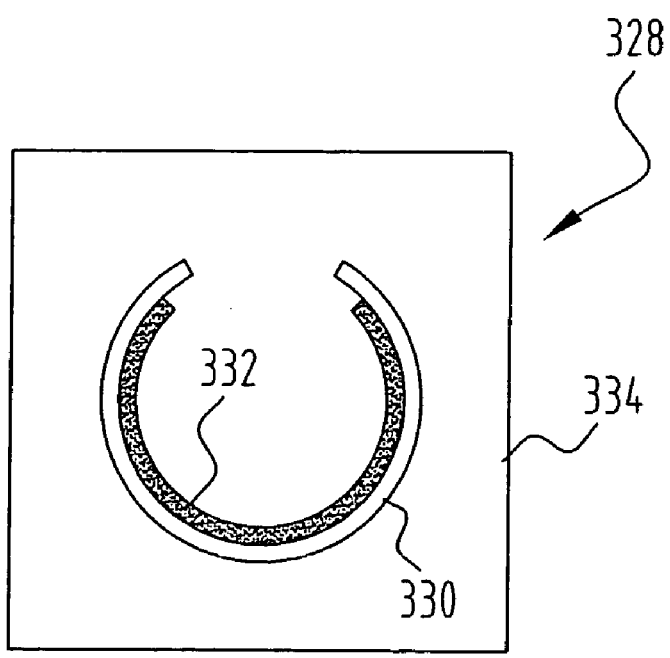
FIG. 12 shows a schematic sectional view of a displacement transducer with a flexible carrier, which is rolled.

It may in principle be provided, as schematically indicated in FIGS. 11 and 12, that a displacement transducer 320 (FIG. 11) comprises a carrier 322 made of a flexible material such as for example a film material. A coil 324, which is configured for example in a triangular form as described above, is disposed on the carrier 322. For example, the coil 324 is printed on the carrier 322.

The carrier 322 with the coil 324 is disposed in a housing 326.

The carrier 322 with the coil 324 is for example bent or folded, in order in this way to reduce the transverse dimensions of the carrier 322. This allows a displacement transducer with reduced transverse dimensions to be produced.

As a result, a displacement transducer can for example be held in a channel-shaped or groove-shaped recess 306, 308, as described above with reference to FIG. 7.

It is also possible, as schematically shown in FIG. 12, for a displacement transducer 328 to comprise a flexible carrier 330 with a coil 332 disposed on it, the carrier 330 being rolled. This arrangement is then positioned in a housing 334. In the case of this exemplary embodiment, too, the transverse dimensions of the displacement transducer 328 can be kept small.

Figure 8:
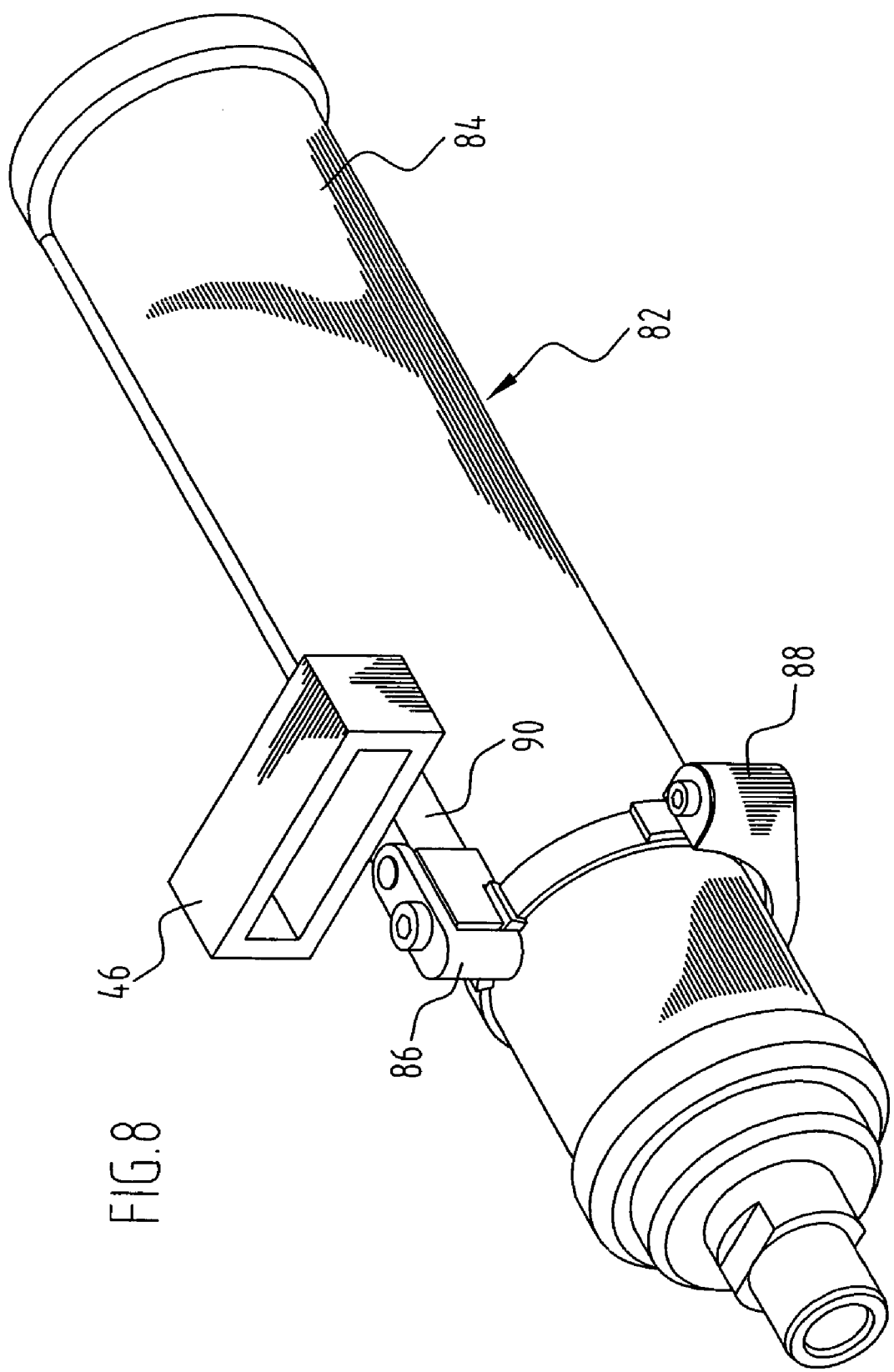
FIG. 8 shows a further example of a pneumatic cylinder with a fixed fixing device.

A further example of a pneumatic cylinder, which is shown in FIG. 8 and designated as a whole by 82, comprises a cylindrical housing 84. Seated on the housing 84 is a holder 86, which is fixed on the housing 84 by means of a clip 88, for example.

This holder 86 in turn holds an adapter 90, for example by means of one or more positively engaging elements. The adapter 90 is in turn provided for the fixing of a position measuring system 10. For example, for this purpose the fixing device 46 is fixed on the adapter 90.

The adapter 90 may also hold a displacement transducer.

Figure 9:
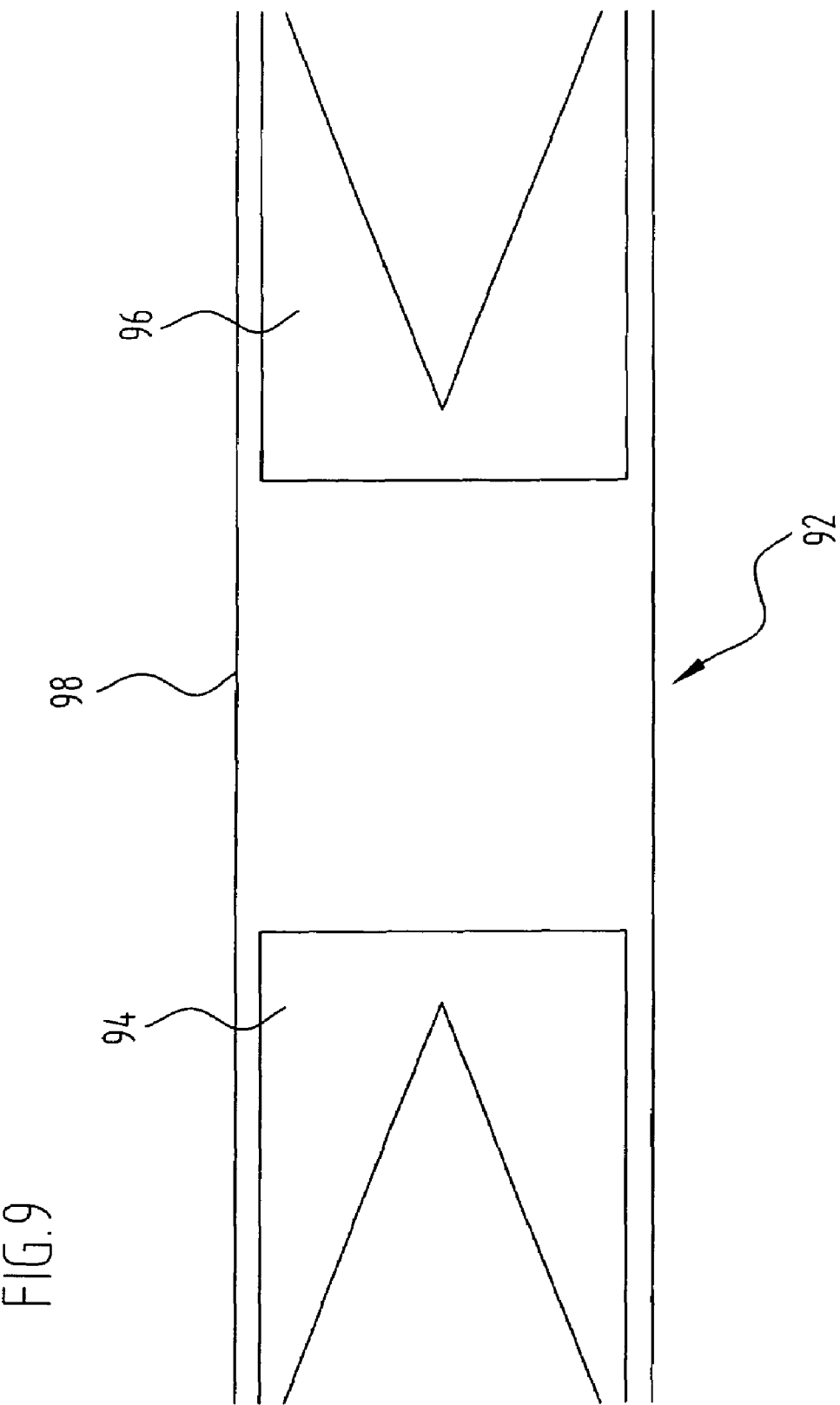
FIG. 9 shows a second exemplary embodiment of a position measuring system according to the invention in a schematic representation.

In the case of a second exemplary embodiment of a position measuring system according to the invention, which is shown in FIG. 9 and designated there as a whole by 92, a first displacement transducer 94 and a second displacement transducer 96 are once again provided, the two displacement transducers 94, 96 being formed in principle as described above with reference to the displacement transducers 14 and 16. The displacement transducers 94, 96 are disposed in a housing 98, which may be open or closed. It must be ensured that the transmitter 12 can be coupled to the displacement transducers 94, 96.

The two displacement transducers 94, 96 are fixably displaceable in the housing 98, in order to set the measuring range. In particular, an overlap may be provided as described above.

The housing 98 may in this case be formed such that it can be adjusted in length.

It may also be provided that both the first displacement transducer 94 and the second displacement transducer 96 are held separately in the housing 98, at least one of the two displacement transducers being displaceable in relation to the other displacement transducer.

It may also be provided that only one displacement transducer is held on the housing 98, while the other displacement transducer is held by means of a fixing device as described above (fixing device 46) on the other displacement transducer. In the first case, the housing 98 forms the fixing device.

The housing 98 may be formed for example as a profiled housing, which has guides for at least one displacement transducer 94, 96.

Figure 10:
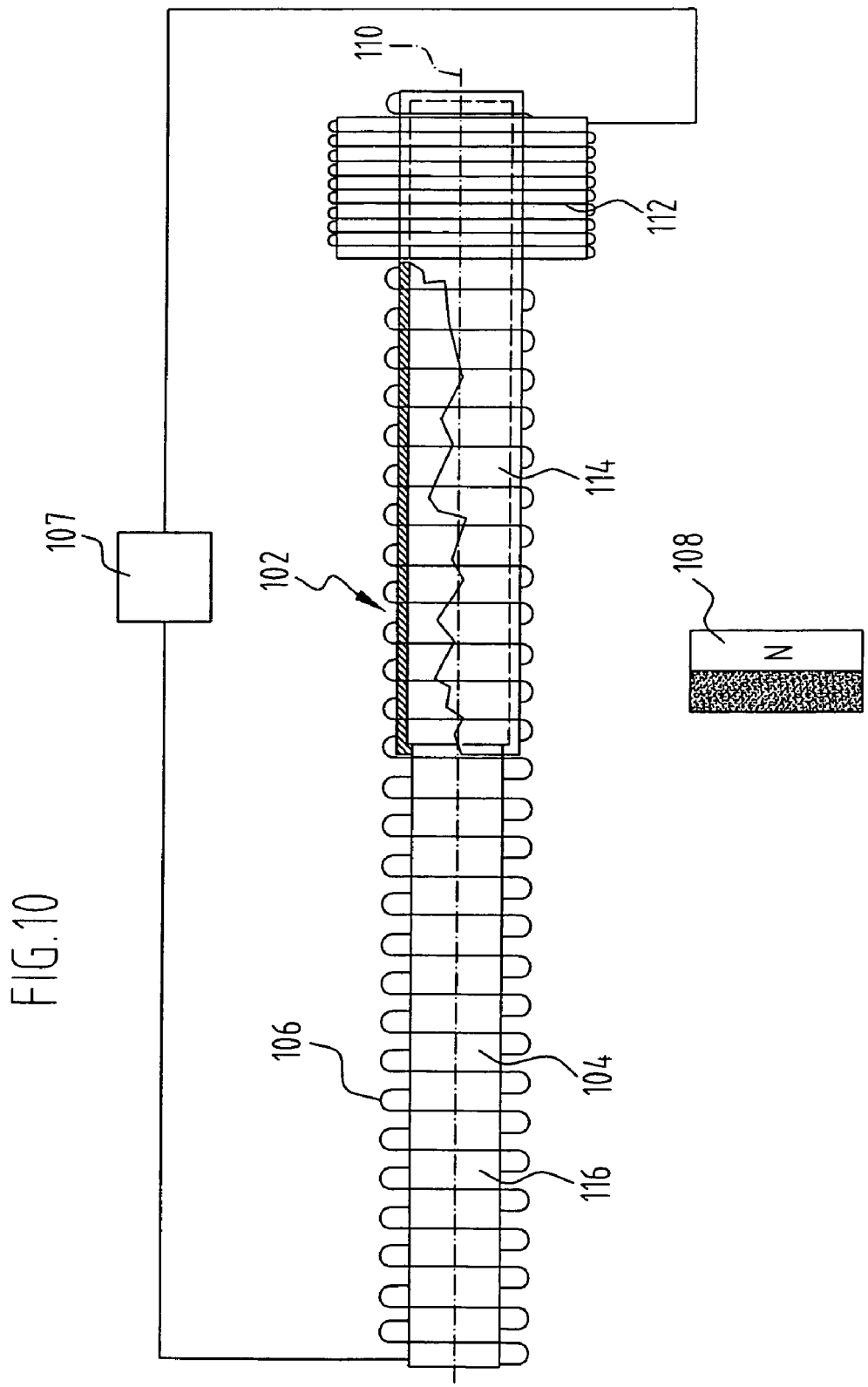
FIG. 10 shows a third exemplary embodiment of a position measuring system according to the invention.

In the case of a third exemplary embodiment of a position measuring system according to the invention, which is shown in FIG. 10 and designated there as a whole by 102, a soft-magnetic core 104 is provided. Wound around the soft-magnetic core 104 is a measuring coil 106, which in turn is integrated in a resonant circuit 107.

Acting as the transmitter 108 is a magnet, which is magnetized axially with respect to the measuring coil 106, that is to say the direction of magnetization of the transmitter 108 is substantially parallel to a longitudinal direction 110.

The core 104 with the wound-around coil 106 extends in the longitudinal direction 110. A reference coil 112 is connected in series with the measuring coil 106.

The core 104, which is produced in particular from a ferrite material and formed in a thin manner, for example as a flat strip, has a defined magnetization. The magnetization is influenced by the transmitter magnet 108 in dependence on its position in the longitudinal direction 110. This in turn influences the resonant circuit 107. This influencing brings about an attenuation, a phase shift and a change in the frequency of the resonant circuit. The position of the transmitter magnet 108 in the longitudinal direction 110 with respect to the core 104 can be deduced from this change, that is to say the position of the transmitter 108 in the longitudinal direction 110 can be determined.

According to the invention, it is then provided that the core 104 is of a multipart form. In the case of the exemplary embodiment shown in FIG. 10, the core 104 is of a two-part form. It comprises a first core part 114, which acts as a first displacement transducer. A second core part 116 acts as a second displacement transducer at least together with the measuring coil 106 (which extends over both core parts 114 and 116).

The two core parts 114 and 116 are displaceable in relation to each other, in order to set the measuring range in the longitudinal direction 110. For example, the first core part 114 has a recess, which is entered by the second core part 116. The two core parts 114 and 116 are fixable in relation to each other by means of a fixing device.

The measuring range can be set by means of the setting of the relative position of the two core parts 114 and 116.

The measuring coil 106 is wound around the entire core 104 with the two core parts 114 and 116. When a measuring range has been set by the relative position of the two core parts 114 and 116, a corresponding measuring coil 106 is used to surround the two core parts 114 and 116 and to extend over the length of the core 104. A measuring coil which can be adjusted in length may also be provided, and is then adjusted in length to the length of the core 104 in a way corresponding to the relative position of the two core parts 114 and 116.

Alternatively, it is possible to provide a number of measuring coils which are correspondingly connected in series. The number of measuring coils determines the length of the coil arrangement; this length can be set by choosing the number.

In the case of the positioning measuring system 102, too, the measuring range can be set by means of the relative positioning of the two core parts 114 and 116 and appropriate adaptation of the measuring coil 106. In particular, the two core parts 114 and 116 can be displaced telescopically in relation to each other.

Figure 13:
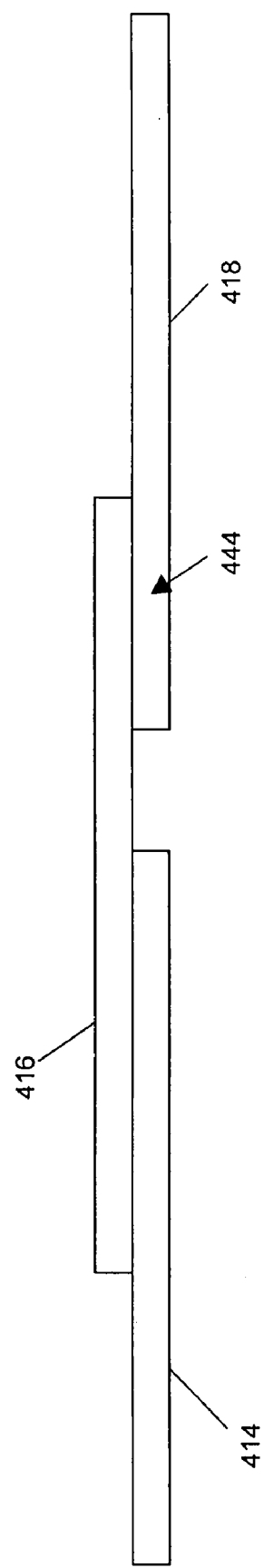
FIG. 13 shows a block diagram of a further example embodiment of a position measuring system according to the invention.

A further exemplary embodiment of a position measuring system according to the invention is shown in FIG. 13. The example position measuring system shown in FIG. 13 includes a first displacement transducer 414, a second displacement transducer 416, and a third displacement transducer 418. The relationship between the first displacement transducer 414 and the second displacement transducer 416 is as described above in connection with the first displacement transducer 14 and second displacement transducer 16 of FIGS. 1 and 2. In the FIG. 13 example embodiment, the third displacement transducer 418 is fixed with respect to the second displacement transducer 416 with an overlapping region 444. The relationship between the third displacement transducer 418 and the second displacement transducer 416 is similar to the relationship between the first displacement transducer 14 and the second displacement transducer 16 described above in connection with FIGS. 1 and 2. Those skilled in the art will appreciate that this third displacement transducer 418 provides further possibilities for setting the measuring length of the measuring system.

The invention claimed is:

1. Position measuring system, comprising:
   a transmitter;
   a first displacement transducer, to which the transmitter is contactlessly coupled with a coupling strength which is dependent on the relative position between the first displacement transducer and the transmitter;
   a second displacement transducer, to which the transmitter is contactlessly coupled with location-dependent coupling strength; and
   a fixing device for fixing the first displacement transducer and the second displacement transducer to each other, so that the measuring range of the position measuring system extends over the first displacement transducer and the second displacement transducer;

wherein the first displacement transducer and the second displacement transducer are fixable to each other in such a way that the measuring range of the position measuring system is adjustable.

2. Position measuring system according to claim 1, wherein the second displacement transducer is positioned on the first displacement transducer.

3. Position measuring system according to claim 1, wherein a longitudinal axis of the first displacement transducer and a longitudinal axis of the second displacement transducer are parallel.

4. Position measuring system according to claim 1, wherein the first displacement transducer and the second displacement transducer respectively have an effective sensor region which varies transversely to a direction of separation between the transmitter and the respective displacement transducer.

5. Position measuring system according to claim 4, wherein the effective sensor region varies transversely to a longitudinal direction of the respective displacement transducers.

6. Position measuring system according to claim 1, wherein the first displacement transducer and the second displacement transducer have an overlapping region in the position measuring system.

7. Position measuring system according to claim 6, wherein the size of the overlapping region is settable.

8. Position measuring system according to claim 1, wherein the fixing device fixes the first displacement transducer and the second displacement transducer with respect to each other with nonpositive engagement.

9. Position measuring system according to claim 1, wherein the fixing device engages around the first displacement transducer and the second displacement transducer.

10. Position measuring system according to claim 1, wherein evaluation electronics are disposed on a carrier for a sensitive element.

11. Position measuring system according to claim 1, wherein the fixing device is produced from an electrically insulating material.

12. Position measuring system according to claim 1, wherein the fixing device is formed in such a way that it holds at least one of the first displacement transducer and the second displacement transducer.

13. Position measuring system according to claim 1, wherein the fixing device comprises a housing in which at least one of the first displacement transducer and the second displacement transducer are held.

14. Position measuring system according to claim 13, wherein the fixing device comprises at least one recess on the housing for holding a displacement transducer.

15. Position measuring system according to claim 14, wherein the at least one recess is formed as a groove in which the associated displacement transducer is fixable.

16. Position measuring system according to claim 14, wherein the at least one recess and the associated displacement transducer are adapted to each other such that the displacement transducer is longitudinally displaceable in the recess before the fixing.

17. Position measuring system according to claim 1, wherein the first displacement transducer and the second displacement transducer respectively comprise one or more sensitive elements which are formed such that they vary locationally.

18. Position measuring system according to claim 17, wherein at least one displacement transducer is provided with a layer which is magnetically saturable.

19. Position measuring system according to claim 18, wherein the layer which is magnetically saturable is produced from an electrically conducting material.

20. Position measuring system according to claim 18, wherein the layer which is magnetically saturable is formed by means of a film.

21. Position measuring system according to claim 18, wherein the layer which is magnetically saturable is disposed on a side facing at least one of the other displacement transducer and a side facing away from it.

22. Position measuring system according to claim 21, wherein a carrier is provided with a metal layer on the side facing away from the other displacement transducer.

23. Position measuring system according to claim 1, wherein at least one further displacement transducer, which is fixed on an adjacent displacement transducer by a fixing device, is provided.

24. Position measuring system according to claim 1, wherein the first displacement transducer and the second displacement transducer respectively comprise at least one inductive element as a sensitive element.

25. Position measuring system according to claim 24, wherein the at least one inductive element is disposed as a flat coil on a carrier.

26. Position measuring system according to claim 25, wherein the carrier comprises a printed circuit board.

27. Position measuring system according to claim 25, wherein the carrier is flexible.

28. Position measuring system according to claim 27, wherein, to form the displacement transducer, the carrier is bent, folded or rolled.

29. Position measuring system according to claim 24, wherein the at least one inductive element is configured as a triangle.

30. Position measuring system according to claim 29, wherein the first displacement transducer and the second displacement transducer overlap in a region of vertices of a triangle of their respective inductive elements.

31. Position measuring system according to claim 24, wherein first displacement transducer and the second displacement transducer are fixed in relation to each other in such a way that their respective inductive elements are facing each other.

32. Position measuring system according to claim 31, wherein at least one electrical insulating layer is disposed between the inductive elements of different displacement transducers.

33. Position measuring system according to claim 24, wherein the at least one inductive element is produced from a magnetically conducting and electrically conducting material.

34. Position measuring system according to claim 1, wherein a soft-magnetic core is provided, around which at least one measuring coil is wound.

35. Position measuring system according to claim 34, wherein the measuring coil is integrated in a resonant circuit.

36. Position measuring system according to claim 34, wherein the transmitter comprises a magnet which is magnetized axially with respect to the measuring coil.

37. Position measuring system according to claim 34, wherein the soft-magnetic core is of a multipart form, with at least a first core part as the first displacement transducer and a second core part as the second displacement transducer, the core parts being positionable in relation to each other.

38. Position measuring system according to claim 34, wherein a reference coil is coupled in series with the measuring coil.

39. Position measuring system according to claim 1, wherein evaluation electronics are disposed outside a carrier for a sensitive element.

40. Position measuring system according to claim 1, wherein a holder is provided for fixing the position measuring system on an application for which it is being used.

41. Position measuring system according to claim 40, wherein an adapter is provided for the position measuring system, by means of which said system is fixable on the holder.

42. Position measuring system according to claim 40, wherein the position measuring system is fixable on the holder by means of the fixing device.

43. Position measuring system according to claim 40, wherein the position measuring system is fixable on the holder by means of one of said displacement transducers.

44. Position measuring systems comprising:
a transmitter;
a first displacement transducer, to which the transmitter is contactlessly coupled with a coupling strength which is dependent on a relative position between the first displacement transducer and the transmitter;
a second displacement transducer, to which the transmitter is contactlessly coupled with location-dependent coupling strength; and
a fixing device for fixing the first displacement transducer and the second displacement transducer in relation to each other, so that the measuring range of the position measuring system extends over the first displacement transducer and the second displacement transducer;
wherein the fixing device comprises an elastic element by means of which the first displacement transducer and the second displacement transducer are clampable with respect to each other.

45. Position measuring system, comprising:
a transmitter;
a first displacement transducer, to which the transmitter is contactlessly coupled with a coupling strength which is dependent on the relative position between the first displacement transducer and the transmitter;
a second displacement transducer, to which the transmitter is contactlessly coupled with location-dependent coupling strength; and
a fixing device for fixing the first displacement transducer and the second displacement transducer to each other, so that the measuring range of the position measuring system extends over the first displacement transducer and the second displacement transducer;
wherein an adjustability in measuring length is provided by being able to set a relative position between the first displacement transducer and the second displacement transducer.

46. Position measuring system, comprising:
a transmitter;
a first displacement transducer, to which the transmitter is contactlessly coupled with a coupling strength which is dependent on the relative position between the first displacement transducer and the transmitter;
a second displacement transducer, to which the transmitter is contactlessly coupled with location-dependent coupling strength; and
a fixing device for fixing the first displacement transducer and the second displacement transducer in relation to each other, so that the measuring range of the position measuring system extends over the first displacement transducer and the second displacement transducer;
wherein the first displacement transducer and the second displacement transducer are fixable in relation to each other in such a way that the measuring range of the position measuring system is adjustable;
wherein the fixing device is formed in such a way that it holds at least one of the first displacement transducer and the second displacement transducer; and
wherein the fixing device comprises a first recess on a housing for holding the first displacement transducer and a second recess on the housing for holding the second displacement transducer.

47. Position measuring system according to claim 46, wherein the first recess and the second recess are disposed to be parallel.

48. Pneumatic cylinder which is provided with a position measuring system, comprising:
a transmitter;
a first displacement transducer, to which the transmitter is contactlessly coupled with a coupling strength which is dependent on the relative position between the first displacement transducer and the transmitter;
a second displacement transducer, to which the transmitter is contactlessly coupled with location-dependent coupling strength; and
a fixing device for fixing the first displacement transducer and the second displacement transducer to each other, so that the measuring range of the position measuring system extends over the first displacement transducer and the second displacement transducer;
wherein the first displacement transducer and the second displacement transducer are fixable to each other in such a way that the measuring range of the position measuring system is adjustable.

49. Pneumatic cylinder according to claim 48, wherein the position measuring system is disposed on a housing of the pneumatic cylinder.

50. Pneumatic cylinder according to claim 49, wherein the position measuring system is disposed in one or more housing grooves.

51. Pneumatic cylinder according to claim 50, wherein the position measuring system is disposed inside a housing of the pneumatic cylinder.

* * * * *

UNITED STATES PATENT AND TRADEMARK OFFICE
CERTIFICATE OF CORRECTION

PATENT NO.       : 7,285,950 B2
APPLICATION NO.  : 10/913980
DATED            : October 23, 2007
INVENTOR(S)      : Jagiella Page 1 of 1

It is certified that error appears in the above-identified patent and that said Letters Patent is hereby corrected as shown below:

Column 15, line 36 is corrected to read: -- wherein evaluation electronics are disposed outside a carrier for --.

Signed and Sealed this

Eighteenth Day of March, 2008

JON W. DUDAS
*Director of the United States Patent and Trademark Office*